Patented May 13, 1941

2,241,708

UNITED STATES PATENT OFFICE 2,241,708

TREATMENT OF HYDROCARBONS

Edwin T. Layng, Jersey City, N. J., assignor to Process Management Company, Inc., New York, N. Y., a corporation of Delaware No Drawing. Application November 25, 1938, Serial No. 242,293

8 Claims. (Cl. 260—668)

This invention relates to the process of changing the carbon-hydrogen ratio of hydrocarbons by hydrogenation and dehydrogenation reactions and the preparation of an active catalyst for these reactions. More particularly, the invention relates to the thermal treatment of hydrocarbons in the presence of a catalyst including as an active ingredient a chromium oxide compound which has been prepared by the ingnition of chromic acetate.

In carrying out the process the hydrocarbon is passed over the catalyst, preferably in the gaseous or vaporous state, at an elevated temperature. The temperature employed depends upon the nature of the hydrocarbon or hydrocarbons under treatment and the nature of the reaction involved. Ordinarily in dehydrogenation a suitable temperature within the range of 350° to 650° C. may be employed. The time of contact will depend upon the nature of the materials undergoing treatment, the temperature employed and the degree of hydrogenation or dehydrogenation desired. For example, in the treatment of heptane at 475° C. a reaction time of a few seconds only is sufficient to effect simple dehydrogenation. However, if it is desired to effect cyclization and the production of aromatic compounds a longer reaction time is necessary. In effecting hydrogenation of unsaturated hydrocarbons it is of course necessary to admix hydrogen with the hydrocarbons passing over the catalyst in an amount sufficient to effect the desired degree of hydrogenation under the selected operating conditions.

The preparation of the catalyst is effected by heating chromic acetate to effect decomposition of the acetate to chromium oxide in a highly active form. The decomposition may be effected by heating the acetate to a moderate temperature such as 300° C., or the acetate may be heated to a temperature as high as or higher than the temperature of the reaction in which the catalyst is to be used. For example, an active catalyst for dehydrogenation of heptane can be prepared by heating chromic acetate to a temperature of approximately 650° C., the acetate undergoing decomposition while being heated up to this temperature.

The decomposition of the acetate may be effected in air or in an inert atmosphere. For best results, however, it is preferred to heat the source material in an inert or non-oxidizing atmosphere such as nitrogen, hydrogen, or steam, particularly if high temperatures are to be employed; or the acetate may be heated to a moderate temperature in the presence of air and then heated to relatively high temperature such as 650° C. in the presence of an inert gas such as nitrogen.

The acetate need be heated for a time sufficient only to effect the desired decomposition. Heating the material for a moderate time beyond the point of decomposition apparently is not harmful but it is not apparent that heating any length of time beyond the point of decomposition is necessary in the production of an active catalyst.

Examples of the preparation of the improved catalyst of the present invention are given below under Examples I and II.

Example I

Chromic acetate is heated in air to 300° C. and then further heated in nitrogen to 650° C. The original material consisting of small shiny black crystals is converted to a product having about the same appearance but with a greenish cast. The particles of solid residue are used as such as catalyst material. During the heating decomposition byproducts of a volatile nature such as acetone, acetic acid, water, carbon monoxide and carbon dioxide are evolved.

Example II

Chromic acetate of the same character as employed in Example I is heated in an atmosphere of nitrogen to a temperature of 650° C. in four hours. The material is maintained at this temperature for two hours and then allowed to cool to room temperature. The product appears to consist of small, greenish black crystals.

Chromium oxide catalysts produced by this method are active hydrogenation-dehydrogenation catalysts. For example, in the dehydrogenation of heptane at 475° C. they exhibit an activity substantially greater than the activity of a chromium oxide catalyst of the gel type prepared by drying the gelatinous precipitate obtained by slow precipitation from a salt solution. The catalyst produced according to Example I exhibits an initial activity twice that of the gel-type catalyst while the initial activity of the catalyst produced according to Example II is about 10% greater than that of the catalyst produced according to Example I. These are comparisons of the relative quantities of hydrogen produced in a unit period of time.

During use the catalyst produced according to the present invention exhibits a slight decline in activity over a series of five to ten runs. The activity of the catalyst becomes stabilized during this time, however, at a figure approximately thirty per cent greater than the activity of the above-mentioned gel-type catalyst, and the catalyst exhibits the stabilized activity indefinitely, if revivified intermittently by the passage of air thereover followed by activation with hydrogen.

The new method of preparing a chromium oxide catalyst has the advantage, over the preparation of catalysts by precipitation of a gel and washing and drying the precipitate, that it involves an expenditure of time and labor which is a small fraction of that necessary in the preparation of the gel-type catalyst. Furthermore, the new catalyst exhibits greater thermal stability in that it is unaffected by temperatures substantially above those employed in hydrogenation-dehydrogenation reactions. It can, for example, be revivified periodically by the passage of air thereover without the necessity of precautions to avoid overheating.

I claim:

1. The method of changing the carbon-hydrogen ratio of a hydrocarbon which comprises passing said hydrocarbon at an elevated temperature over a catalyst comprising an active ingredient prepared by igniting chromic acetate.

2. The method of changing the carbon-hydrogen ratio of a hydrocarbon which comprises passing said hydrocarbon at a temperature of 350° to 650° C. over a catalyst comprising an active ingredient prepared by igniting chromic acetate.

3. The method of dehydrogenating a hydrocarbon which comprises contacting said hydrocarbon at elevated temperature with a catalyst comprising an active ingredient prepared by igniting chromic acetate.

4. The method of claim 3 wherein said active ingredient of the catalyst has been prepared by heating chromic acetate in an inert atmosphere to effect decomposition thereof.

5. The method of claim 3 wherein said active ingredient of the catalyst has been prepared by heating chromic acetate in an atmosphere of nitrogen to effect decomposition thereof.

6. The method of claim 3 wherein said active ingredient of the catalyst has been prepared by heating chromic acetate at elevated temperature to effect decomposition thereof, and thereafter heating the residue to a temperature of approximately 650° C. in an atmosphere of nitrogen.

7. The method of making aromatic hydrocarbons which comprises contacting aliphatic hydrocarbons having at least six carbon atoms per molecule with a catalyst comprising an active ingredient prepared by thermal decomposition of chromic acetate at elevated temperature for a time sufficient to effect cyclization of said aliphatic hydrocarbons and conversion thereof to an aromatic product.

8. The method of making aromatic hydrocarbons which comprises contacting an aliphatic hydrocarbon having at least six carbon atoms per molecule with a catalyst comprising an active ingredient prepared by thermal decomposition of chromic acetate at elevated temperature for a time longer than that necessary to effect simple dehydrogenation.

EDWIN T. LAYNG.